Feb. 16, 1943.                M. GAERTNER                    2,311,377
                              OIL FILTER
                         Filed June 21, 1939              2 Sheets-Sheet 1

INVENTOR
Moritz Gaertner

Feb. 16, 1943. M. GAERTNER 2,311,377
OIL FILTER
Filed June 21, 1939 2 Sheets-Sheet 2
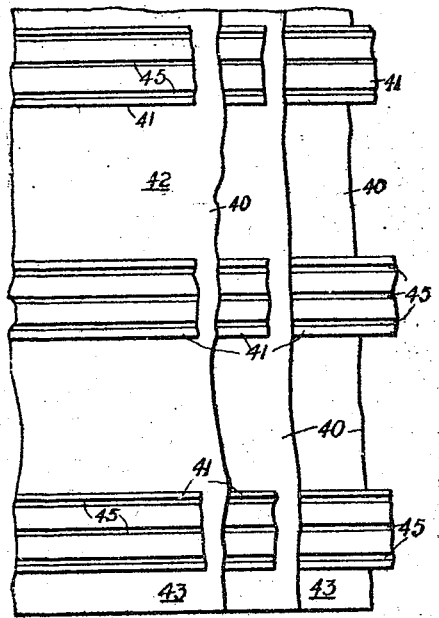
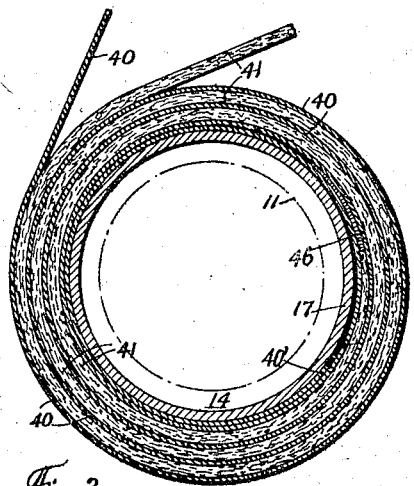
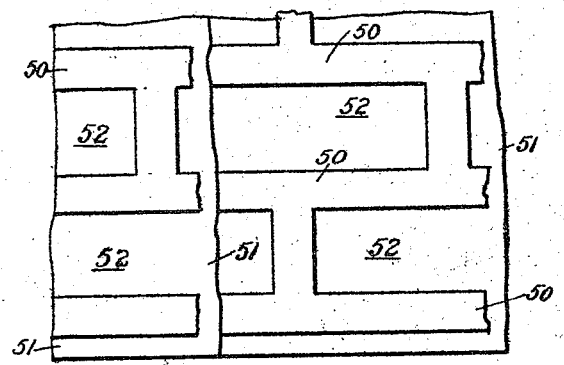
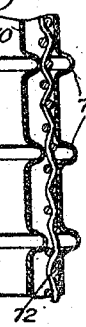
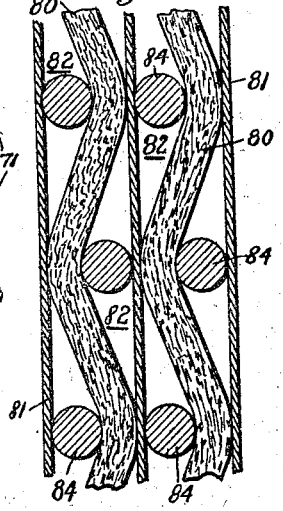
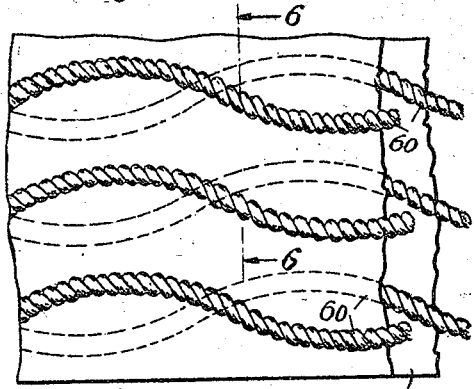
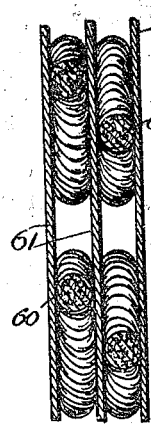
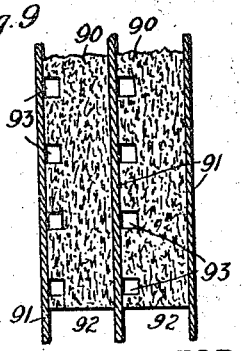
INVENTOR
Moritz Gaertner Patented Feb. 16, 1943

2,311,377

UNITED STATES PATENT OFFICE 2,311,377

OIL FILTER

Moritz Gaertner, New York, N. Y.

Application June 21, 1939, Serial No. 280,293

16 Claims. (Cl. 210—178)

This invention generally relates to filters and more particularly relates to improved filter constructions and arrangements for purifying liquids such as lubricating oil.

Realization of the importance of filtration of lubricants in industrial machines, such as combustion engines, is now widespread. The removal of the grit, dust, metallic particles, and other harmful sediments and emulsions collected by the circulating lubricant prevents power losses and wear of the machine and prolongs the useful life of the lubricant.

Prior filters, however, have not maintained their filtering efficiency over a sufficiently long period of time. Thus filters which were rated at 5,000 miles for automobile oil filtration are usually clogged, punctured or otherwise ineffective after only about 1,000 miles of travel. Both a clogged filter, which greatly increases the required oil circulation pressure, and a punctured filter leave the oil dangerously unclean. A prior art filter constructed to maintain its filtering efficiency requires rather expensive filter material to withstand the pressures of the circulating oil, generally ranging from about 25 to 75 pounds per square inch in practice.

It is among the objects of the present invention to provide a relatively inexpensive renewable filter insert construction of comparatively high filtering efficiency which performs consistently and dependably in practice throughout a relatively long useful life period; to provide a novel filter insert constructed with a plurality of spaced filtering sections interspread with frictional filtration regions intermediate the filter sections; to provide a compact cartridge-like filter insert built up of strips of filtering material supported by non-collapsible oil-resistant walls and arranged to receive the lubricant edgewise, an arrangement greatly increasing the resistance of the filtering material against deformation and breakdown in service, permitting the use of less expensive material for a given service and materially improving the per unit volume filtering efficiency; to provide an improved filter insert construction the manufacture of which is readily controllable for consistent and uniform performance in the field; and to provide an efficient yet relatively inexpensive filter insert for extensive general use.

In accordance with a preferred form of my invention I arrange a plurality of thin filtering media in substantially spaced relationship between parallel oil-resistant or non-absorptive layers or separating walls. The filtering material is preferably, though not necessarily, convolutely-wound into a cartridge-like body with sections of the filtering material spaced along the filtering direction to form successive filter regions. The lubricant passes into the filter edgewise through the first filtering section, and is purified to some extent. The lubricant then reaches a substantial open region in its passage to the next filtering section. The lubricant and tacky impurities thereof adhere along the non-absorptive walls bounding this region due to surface tension action, and foreign matter of the moving lubricant is frictionally retained on the walls. The process of filtering is alternated with surface tension or frictional deposit of the impurities of the lubricant through the plurality of sections comprising the filter body, resulting in efficient purification of the lubricant by a compact filter unit.

An important feature of my invention is the combination of a plurality of filter layers, preferably thin, with alternate non-absorptive layers arranged into a filtering system receiving and conducting the lubricant therethrough edgewise, namely in the direction parallel to the layers. Such construction structurally reenforces and strengthens the porous filtering material, insuring against its breakdown in service. Furthermore relatively weaker and less expensive filtering materials may be used in this manner than heretofore used for a particular filter design and performance. The alternate porous and non-porous layers arranged for edgewise filtering results in the mentioned practical advantages.

A modified form of the invention combines porous filtering layers with spaced wires forming alternate spaces or open regions to effect successive filtering actions on the lubricant in its edgewise passage through the unit. A further form of the invention employs cloth or wire mesh layers in combination with adjacent non-porous corrugated layers to form an edgewise filtering system operative with very low pressure drops, such as of the order of 4 pounds per square inch or less.

The foregoing and other objects and advantages of my invention will become more apparent from the following description of exemplifications thereof illustrated in the accompanying drawings in which:

Figure 2 is an enlarged partial horizontal sectional view through the filter insert of Figure 1, taken along the line 2—2 thereof.

Figure 2a is an enlarged partial sectional view of a modification of Figure 2.

Figure 3 is an enlarged partial view of a development of several layers comprising the filter insert shown in Figures 1 and 2.

Figures 4 and 5 are partial developments showing modified forms of the filter insert, corresponding to the view of Figure 3.

Figure 6 is an enlarged partial sectional view through Figure 3 as taken along line 6—6 thereof.

Figures 7, 8 and 9 are enlarged partial end views of further modified forms for the filter unit of the invention.

Figure 1:
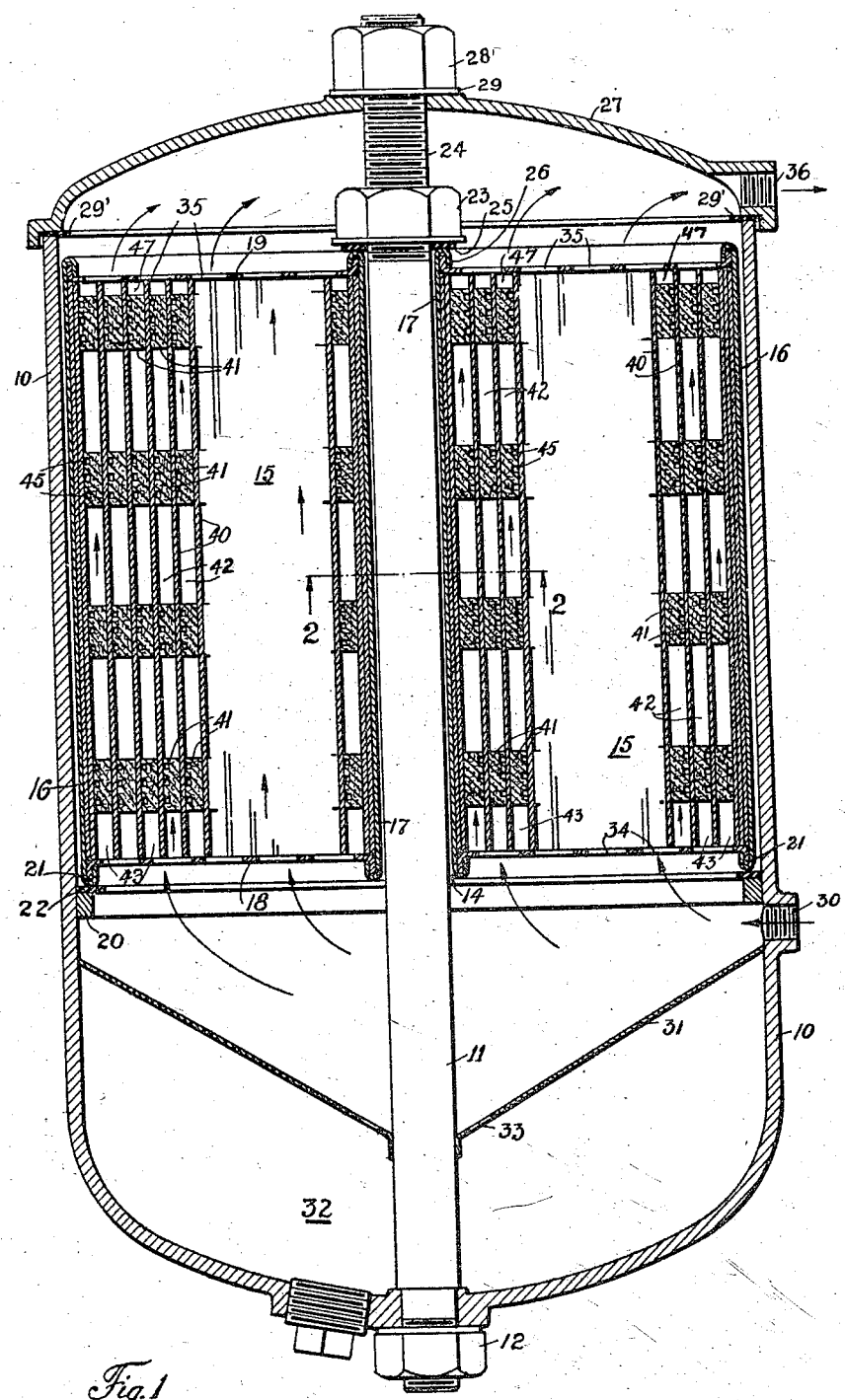
Figure 1 is a vertical cross-sectional view through an assembled filter system containing a filter insert of the invention with a portion shown diagrammatically.

In the drawings, I show in Figure 1 a vertical cross-sectional view through a filter assembly designed primarily for automotive combustion engines such as for automobiles, buses, trucks and the like, to purify the circulating lubricant thereof. It is to be understood that other applications of filters of my invention are equally feasible such as for liquids, gases and oils, for Diesel engines and industrial machines in general. Filter housing 10 is a metallic shell having a bolt 11 fastened centrally at the bottom section thereof by nut 12. Filter unit 15 is in the form of a cannister-like insert encased by an outer metallic can 16 and having a central opening 14 concentric with bolt 11 sheathed by metallic core 17. Perforated end plates or discs 18 and 19 are respectively gripped against the bottom and top of unit 15 by the ridged edges of shells 16 and 17.

A retaining ring 20 is secured to the inside of shell 10 which supports the spun over lower outer ridge 21 of filter insert 15. A packing ring 22 is placed between ridge 21 and ring 20 to afford a seal and prevent by-passing of the lubricant around insert 15 and insure its passage through it. A nut 23 operates on the upper threaded portion 24 of central bolt 11 against a gasket or sealing washer 25 and top inner ridge 26 of insert 15. This arrangement prevents leakage and by-passing of the lubricant through the central core, and also mechanically fixes the filter insert in proper position in shell 10. A cover 27 extends over shell 10 and is secured in place by nut 28 on the threaded end of bolt 11. Washers 29 and 29' seal the unit at the cover 27 as shown.

The circulating lubricant or oil is admitted to the filter through an oil inlet 30 at the lower side of shell 10. Whenever the term oil is used in the specification a lubricant in general is meant, particularly one which collects foreign matter in operation and is to be purified by a filter of the class of the present invention. It is to be understood, however, that the principles of the invention are applicable to other types of liquids or gases. The oil passes over conical diaphragm 31 extending over sludge chamber 32. Openings 33 in diaphragm 31 permit heavier impurities and particles of the oil to sink into chamber 32. The oil or lubricant passes into filter insert 15 through perforations 34 of lower disk 18. The oil passes edgewise through the convolutely wound filter insert 15 in a manner to be described in more detail, and out through perforations 35 in upper disc 19. By this time the oil is purified and it passes out through oil outlet 36 in cover 27 for recirculation through the engine in the usual manner.

The oil is accordingly circulated and otherwise directed edgewise through the convolutely wound filter insert 15 with no by-passage of the oil around the filter unit. The insert illustrated in Figures 1, 2 and 3 comprises a convolutely wound non-absorptive layer or separator 40 interwound with filtering ribbons or elements 41 spaced edgewise from each other by a substantial amount to form open regions 42 between elements 41. The ribbons or bands 41 may be merely frictionally engaged with separator 40, as long as they are properly held in operative assembly after being wound-up. Ribbons 41 may however be cemented, waxed, pasted, indented or otherwise secured to separator layer 40 at their proper positions while being spirally wound-up.

The filter insert 15 of Figures 1, 2 and 3 is preferably formed by winding-up a continuous sheet of material 40 which will not absorb the lubricant, convolutely with filtering material 41. Stacking of flat separator sheets alternately with filtering strips may be employed instead, but the winding-up method is preferred. I have found that an inexpensive non-absorptive and oil-resistant sheet, which serves excellently, is hard pressed paper in the range of .004 to .010 inch thick, treated by the usual cold rolling process. It is, however, to be understood that other materials may be employed as separator 40, such as fiber or metal, and the thickness thereof used may differ widely, as desired. What is important is its quality of non-absorption as well as an inherent surface tension oil-cleansing action to be described.

The filtering or porous ribbons 41 are wound together with the separator 40 to form the compact self-supporting filter insert 15 shown. The inside end 40' of separator 40 is secured, such as by cementing, to inner core 17 of the unit 15. Separator sheet 40 is then preferably wound about core 17 for a full turn before attaching or including filtering ribbons 41 in the winding. The winding then proceeds firmly with the ribbons 41 properly separated from each other, as shown, to form open regions 42. After the winding-up proceeds to the predetermined diameter of the insert, the outer end of separator 40 is cemented or otherwise fastened to hold the assembly together in a suitable manner. The insert is then slipped into can 16, and the ends of the can 16 and core 17 are suitably spun over perforated end plates 18 and 19 to complete the construction of insert 15 as illustrated in Figure 1. It is to be understood that the metallic can and core 16 and 17 may be replaced by a fiber casing, a cotton bag or sheath of different material.

The porous strips or filaments 41 are preferably each continuous or otherwise coextensive with the continuous separator 40, though separated strips may be used. The strips or ribbons 41 are of porous pervious material such as cellulose or wood pulp, shredded cotton, a mixture of asbestos and cotton, hemp, wool, rock wool, mineral wool, or any other soft or fibrous material pervious to the liquid to be purified. The shape of strips 41 is preferably narrowest in the radial direction, and wider in the axial direction of the wound insert.

A satisfactory thickness for ribbons 41 is in the range of .025 inch to .125 inch if soft or compressible, and width of $\frac{1}{16}$ to 2 inches. Widely different dimensions thereof are equally feasible. Where a thickness greater than $\frac{1}{8}$ inch is required for ribbons 41, two or more juxtaposed strips should preferably be wound with separator 40. Figure 2a illustrates this form where two porous layers 41' are between turns of separator 40. The layers 41' are staggered at the start to insure better closure at the ends of the winding to eliminate or minimize by-passing of the oil in triangular spaces 45. I prefer to compress or taper the ends of layers 41' to entirely eliminate the open triangles indicated in section at 45. Similarly, the triangular region 46 of Figure 2 is blocked up with a separate triangular piece indicated in solid, or is formed by suitably tapering the corresponding ends of ribbons 41. The compactly wound unit 15 such as shown in Figure 1 is self-supporting, and resists breakdown or deformation of the inherently structurally weak pervious material 41. Thus cheaper materials may be employed for a given filtering assembly, materially reducing the cost of each insert, and greatly increasing the reliability in service. The relative dimensions and compactness of the porous strips 41 as well as the character of its material depends on the pressure, type and efficiency of filtering desired.

The oil is conducted from the bottom of the insert 15 through to the top as described in connection with Figure 1. The lowest edge of the porous elements 41 does not reach disc 18, but is spaced therefrom forming separating channel 43. The lubricant is permitted to flow up through the perforations 34 without blockage. The oil is then constrained or otherwise caused to move edgewise through the first lowest filter section 41 at the lower spiral channel or slot 43 of the non-absorptive separator 40. The inlet separating channel 43 is a very important feature of my invention. It permits full utilization of the whole area of the filter medium at the inlet. In prior filters the absorptive filter material abutted the perforated end disc, and the inlet surface of the material was blocked a substantial amount. Free access of the oil to the full incident or initial filter area is made feasible by my spaced construction.

The oil impinges on the lowest ribbon 41 and flows through it edgewise. I have found that the greatest filtering action by a porous media occurs where the liquid first impinges thereon, i. e. at the incident surface region thereof. Thus impurities of the oil are stopped or impeded at the incident surface strip 41, while some impurities are absorbed by the strip. The oil continues towards the next filter strip to the adjacent open regions 42. Open region 42 serves as a reservoir, retaining impurities of the oil passing beyond the previous filter strip 41. An important feature of my novel arrangement is, that due to the surface tension action of the non-absorptive walls 40, a gummy asphaltic adhering layer forms on the surfaces of separator 40 bounding the open regions 42. The gummy or tacky layers trap particles of the flowing oil. The open spaces 42 in series between filtering media 41 trap or otherwise retain particles of the oil which find a greater resistance entering the filter strips than reposing in spaces 42 with the gummy, tacky walls.

The frictional and surface tension filtering action due to the regions 42 becomes increasingly more effective as the gummy impurities start coating the open surfaces of separator 40, which action increases the attraction and coagulation of foreign particles thereon. This action is very important to the filter of the invention since even in a comparatively small filter insert the combined frictional area is upwards of several square feet. About 30 to 50 square inches of such surface can be readily realized in practice per cubic inch of filter insert built in accordance with Figures 1, 2 and 3.

The efficient filtering action of the unit of my invention depends upon two independent though cooperative features. The first is the utilization of the phenomenon that the maximum filtering action through a porous body occurs at or near the incident surface thereof, regardless of the thickness of the body. By utilizing spaced ribbons 41 I obtain far greater absorptive or separative filtering of the impurities of the liquid or lubricant passing successively between them with corresponding successive impingements upon incident filter surfaces than would occur if the filtering material were continuous throughout the unit. The second action, independent of the former, is due to the open regions, such as 42, bounded by non-absorptive walls. Surface tension causes adhesion of impurities and tacky substances thereto retaining much foreign matter and purifies the passing liquid. The coarser particles generally are retained in the open regions 42 and at the incident surfaces of the ribbons 41, and the finer impurities within the absorptive ribbons 41.

Filtering bands 41 may advantageously bear the depressions, corrugations or indentations 45 shown in Figures 1 and 3, which form separate additional spaces wherein impurities are retarded and stored in the manner similar to that described in connection with larger spaces 42.

The liquid, gas, or oil accordingly passes up through entrance channel or slot 43 permitting full utilization of the incident surface of the bottom ribbon 41. No by-pass paths are encountered by the substance to be purified which is constrained or otherwise caused to move upwards through the successive filter sections and edgewise through porous strips 41. The exit of the lubricant from the insert 15 is through the perforations 35 in disc 19. The top ribbon 41 is spaced from disc 19 in the manner similar to the bottom ribbon from disc 18 to insure continuous egress of the lubricant through disc 19. The spiral slot or channel 47 adjacent thereto performs this function.

Figure 4 shows a modified form of the invention serving essentially as the form shown in Figures 1, 2 and 3. Instead of separate ribbons of filtering material, a wide filtering sheet 50 is used, more or less coextensive with separator 51. Wide open spaces 52 are cut into filtering sheet 50 to form open regions corresponding to regions 42 in Figure 1 when convolutely wound with separator 51. The physical actions of the unit formed as indicated in Figure 4 are similar to that of Figure 1.

Figures 5 and 6 show a further form which my invention may assume in practice. In place of flat ribbons 41 of Figures 1, 2 and 3, cords or strings of filtering material 60 are employed, separated by non-absorptive spacers 61. In this arrangement the cords 60 are wound in an undulating or waving manner between separator 61 as shown. A great advantage resulting from winding up in this manner is to reenforce and otherwise structurally strengthen the completed unit due to overlapping of the cords between layers as shown by the dotted lines of Figure 5 and the end view Figure 6.

In Figure 7 a low pressure drop filter construction utilizing a plurality of particle-retaining spaces throughout the unit is illustrated in partial section. The low pressure drop unit is useful in aircraft engines where only pressure drops up to a limit of 4 pounds per square inch are tolerated. The insert of Figure 7 utilizes a spirally wound separating band 70 having spaced corrugations 71 therein. Wound with separator 70 is a mesh sheet 72 of wire-cloth, heavy burlap, canvas or the like. Instead of the usual filtering action, purification is accomplished due to continous obstruction offered the impurities by the coarse threads of mesh cloth 72. The filtering effectiveness is enhanced and increased after the impurities have formed a coating or layer on the surfaces, adding to the retaining surface tension, friction and molecular adhesion actions.

In Figure 8 still a further form of the invention is shown in partial section. A wide band of filtering material 80 is spirally wound up with separator sheet 81 together with strings or wires 84 alternated across the length of the unit, as indicated, to form the open spaces or regions 82. The oil flows up edgewise through filtering band 80 and through spaces 82 to be purified thereat by a combined filtering action of spaces 82 and adjacent wall surfaces. The filtering band 80 is preferably thinner or otherwise more porous than the corresponding material of the previous modifications to minimize the resistance of oil flow therethrough.

Figure 9 shows another modification in partial section, wherein the filtering sheet 90 is substantially coextensive with the separator sheet 91 while forming a spiral slot 92 at the inlet or bottom edge of the insert. Filtering sheet 90 is corrugated or otherwise indented at spaced regions 93 to form openings or spaces to serve in a capacity similar to the corresponding openings of the previous examples, such as spaces 42, 52, and 82. The corrugations 93 may be on one side as shown, or on both sides of sheet 90.

It is to be understood that all the partial sectional or developmental views of the modified forms are intended to represent complete insert units wound up and assembled generally in a manner similar to that shown and described in connection with Figures 1, 2 and 3. Variations in size, dimensions or materials entering the construction of the insert, and variations in the general arrangements or applications thereof, are entirely feasible as will be understood by those skilled in the art. The filter insert may be designed for oil filtration or for purifying different liquids, such as milk. I employ the term "liquids" generically, including gases. Accordingly I do not intend to be limited except as set forth in the following claims.

What I claim is:

1. A filter for purifying fluids comprising alternate continuous layers of porous and relatively non-porous material convolutely wound upon each other, said porous layers being of the order of 0.025 to 0.125 inch thick, the outer ends of said porous layers being tapered towards the outer surface of the wound filter, and a non-porous covering about the filter contiguous with the tapered porous layer ends in a manner to prevent by-passing of the fluid about said outer ends, and means for passing the fluid edgewise through said porous layers in the axial direction of the wound filter, said porous layers having a plurality cavities spaced along said axial direction providing open regions for storing impurities of the substance passed therethrough.

2. A system for filtering liquids comprising layers of juxtaposed absorbent and relatively nonabsorbent material convolutely wound upon each other, said absorbent layers comprising a plurality of narrow bands spaced from each other transversely along the winding direction thereo forming open regions faced by surfaces of sai non-absorbent layers, and means for passing th liquid between said non-absorbent layers an edgewise through said absorbent layers, whereb said spaced absorbent bands successively filte the liquid and the non-absorbent surfaces bound ing said open regions are coated with tacky im purities and attract impurities of the liquid, th successive filtering actions at incident surface of said absorbent bands materially enhancing th filtering efficiency of the system.

3. A filter insert for purifying lubricants com prising alternate layers of juxtaposed porous an relatively non-porous material, said porous lay ers comprising ribbons spaced from each othe along the direction transverse to the path of th lubricant forming open regions faced by surface of said non-porous layers, said ribbons havin depressions along a surface portion contiguou with the non-porous layers to provide furthe open regions for storing impurities of the lubri cant, and a casing for said layers for directin the lubricant through said layers.

4. A filter for purifying circulating oil com prising convolutely wound cellulose filtering ele ments and spacing layer, said cellulose element comprising plurality of narrow bands axiall' spaced from each other leaving open region faced by surfaces of said spacing element to pro vide a plurality of series filtering stages sepa rated by said regions, means for passing the oi between said spacing layer and edgewis through said wound cellulose elements, whereb the spaced cellulose bands successively filter th oil and said open regions retain impurities of th oil and whereby the oil-resistant surfaces bound ing said open regions are coated with tacky sub stances and attract impurities of the oil, the suc cessive filtering actions at the incident surface of said cellulose bands materially enhancing th efficiency of the filter.

5. A filter for purifying circulating oil com prising layers of cellulose and oil-resistant pape convolutely wound upon each other, said cellu lose layers comprising a plurality of narrov bands spaced from each other transverse to th winding direction thereof forming open region faced by surfaces of said oil-resistant layers t provide a plurality of series filtering stages sepa rated by said regions, means for passing the oi between said oil-resistant layers and edgewis through said cellulose layers whereby said space cellulose bands successively filter the oil and sal open regions retain impurities of the oil and whereby the oil-resistant surfaces bounding sai open regions are coated with tacky substance and attract impurities of the oil, the successiv filtering actions at the incident surfaces of sai cellulose bands materially enhancing the effi ciency of the filter, and an enclosure for sai layers having a perforated disc at each end there of, said oil-resistant layers extending substan tially to said discs and said cellulose layers bein spaced from said discs to permit free access o oil through said discs and cellulose layers.

6. A filter for purifying circulating oil com prising convolutely wound layers of cellulose an separating paper, said cellulose layers comprising a plurality of narrow bands axially spaced from each other forming open regions faced by surfaces of said separating paper to provide a plurality of series filtering stages separated by said regions, means for passing the oil between said separating paper and edgewise through said cellulose layers whereby said spaced cellulose bands successively filter the oil and said open regions retain impurities of the oil and whereby the separating paper surfaces bounding said open regions are coated with tacky substances and attract impurities of the oil, a plurality of effective filtering edges being presented to the liquid for materially enhancing the efficiency of the filter, said cellulose bands being arranged in a zig°zag manner with respect to said separating paper layers to substantially stiffen the structure of the assembled filter.

7. A filter for purifying circulating oil comprising convolutely wound layers of juxtaposed cellulose and oil-resistant paper, said cellulose layers comprising a plurality of narrow bands axially spaced from each other forming open regions faced by surfaces of said oil-resistant layers to provide a plurality of series filtering stages separated by said regions, means for passing the oil between said oil-resistant layers and edgewise through said cellulose layers whereby said spaced cellulose bands successively filter the oil and said open regions retain impurities of the oil and whereby the oil resistant surfaces bounding said open regions are coated with tacky substances and attract impurities of the oil, the successive filtering actions at the incident edges of said cellulose bands materially enhancing the efficiency of the filter, said cellulose bands having corrugations along a surface portion contiguous with the oil-resistant layers to provide further open regions for storing impurities of the oil.

8. A system for filtering lubricants comprising layers of juxtaposed absorbent and relatively non-absorbent material, said absorbent layers comprising a band having a plurality of substantial openings forming open regions faced by surfaces of said non-absorbent layers, and means for passing the lubricant between said non-absorbent layers and edgewise through said absorbent layers whereby the non-absorbent surfaces bounding said open regions are coated with tacky substances and attract impurities of the lubricant, said absorbent layers having depressions along a surface portion contiguous with the non-absorbent layers to provide further open regions for collecting impurities of the lubricant.

9. A filter insert for purifying liquids comprising a layer of porous material and a separating layer convolutely wound upon each other, said porous layer comprising a plurality of narrow bands axially spaced from each other, each porous band comprising a plurality of contiguous strips arranged in a staggered relationship with respect to each other.

10. A device for filtering lubricants comprising a layer of absorbent and a layer of relatively non-absorbent material convolutely wound upon each other, said absorbent layer comprising a plurality of narrow bands axially spaced from each other along the axial direction of the wound filter forming open regions therebetween, and means for passing the lubricant edgewise through said absorbent layer in said axial direction whereby said spaced absorbent bands successively filter the lubricant and said open regions retain impurities of the lubricant, each absorbent band comprising a plurality of contiguous strips arranged in staggered relationship with respect to each other longitudinally of the strips, the outer end portions of said bands being tapered towards the outer surface to be contiguous with the adjacent outer non-absorbent material in a manner to prevent by-passing of the lubricant through the device about said end portions.

11. A filter insert for purifying liquids comprising convolutely wound layers of absorbent and relatively non-absorbent material, said absorbent layers being thinnest in the direction between said layers, and a plurality of wires arranged between said layers alternated on opposite sides of said absorbent layer transversely of the direction of lubricant passage through the filter insert to provide spaced open regions between portions of said layers for effecting successive filtering actions on the liquid with interspread storage spaces for impurities thereof.

12. A filter comprising alternate layers of cloth and transversely corrugated oil-resistant sheeting to form a filtering unit, and means for passing the lubricant edgewise through said layers whereby impurities of the lubricant are trapped on surfaces of said cloth and sheeting layers and in open spaces provided therein.

13. A relatively low pressure drop device for purifying lubricants comprising convolutely wound layers of wire-cloth and transversely corrugated oil-resistant sheeting, and means for passing the lubricant edgewise through said layers whereby impurities of the lubricant are trapped on surfaces of said cloth and sheeting layers and in open spaces provided therein, and whereby the lubricant passes through the device with a relatively small pressure drop.

14. A device for purifying liquids comprising alternate continuous layers of juxtaposed porous and relatively non-porous material, said porous layers comprising a plurality of narrow strips spaced from each other in a direction transverse to the path of the liquid through the device, the strip spacing leaving open regions in said porous layers that are faced by surfaces of said non-porous layers to provide a plurality of series filtering stages, and means for passing the liquid through said porous layers in said path whereby said spaced porous strips successively filter the liquid passing through the device.

15. A filter device for purifying lubricants comprising a filter unit with alternate continuous layers of juxtaposed porous and relatively non-porous material, said porous layers individually comprising a plurality of ribbons spaced from each other forming open regions which are faced by surfaces of adjacent non-porous layers to provide a plurality of series filtering stages separated by said regions, and an outer casing for said unit having inlet and outlet ports arranged for passing the lubricant in a path therethrough, said unit being arranged in said path whereby the lubricant successively passed through said ribbons across the respective open regions therebetween to filter the lubricant in the series stages.

16. A filter for purifying fluids comprising alternate layers of juxtaposed absorbent and relatively non-absorbent material, said absorbent layers individually having a plurality of spaced open regions faced by the associated juxtaposed non-absorbent layers, and means for passing the fluid between said non-absorbent layers and edgewise through said absorbent layers, said open regions being spaced along their respective layers and in the direction of fluid flow, whereby the fluid is passed through the absorbent layers and successively through said spaced open regions.

MORITZ GAERTNER.